United States Patent [19]

Seng

[11] Patent Number: 4,687,520

[45] Date of Patent: Aug. 18, 1987

[54] ONE-COMPONENT FORMULATION FOR DETACKIFYING AND COAGULATING SYNTHETIC RESIN PAINT FRACTIONS IN WET DEPARATORS OF PAINT-SPRAYING INSTALLATIONS, AND THE USE THEREOF

[75] Inventor: Hans-Peter Seng, Süssen, Fed. Rep. of Germany

[73] Assignee: Zeller+Gmelin GmbH & Co., Eislingen, Fed. Rep. of Germany

[21] Appl. No.: 742,512

[22] Filed: Jun. 7, 1985

[30] Foreign Application Priority Data

Jun. 7, 1984 [DE] Fed. Rep. of Germany ....... 3421289

[51] Int. Cl.$^4$ .............................................. C08L 91/06
[52] U.S. Cl. ..................................... 106/271; 106/270
[58] Field of Search ................ 106/270, 271; 210/712, 210/728

[56] References Cited

U.S. PATENT DOCUMENTS 2,349,326  5/1944  Wilson ................................. 106/271
2,598,666  6/1952  Sesso .................................... 106/271

FOREIGN PATENT DOCUMENTS 2011371  7/1979  United Kingdom .

Primary Examiner—Theodore Morris
Attorney, Agent, or Firm—Burns, Doane, Swecker & Mathis

[57] ABSTRACT

The invention relates to a one-component formulation for detackifying and coagulating synthetic resin paint fractions in wet separators of paint-spraying installations, for causing the detackified paint sludge either to float or to sediment, which formulation comprises (a) 5 to 20% by weight of carnauba wax or raw montan wax,
(b) 10 to 30% by weight of an aminoalcohol, aminoalcohol derivative or morpholine, and, if appropriate,
(c) 0.1 to 50% by weight of an antifoam, each relative to the weight of the formulation, the remainder of the formulation being represented by water, and to the use of the formulation for detackifying and coagulating synthetic resin paint fractions in wet separators of paint-spraying installations.

5 Claims, No Drawings

ONE-COMPONENT FORMULATION FOR DETACKIFYING AND COAGULATING SYNTHETIC RESIN PAINT FRACTIONS IN WET DEPARATORS OF PAINT-SPRAYING INSTALLATIONS, AND THE USE THEREOF

DESCRIPTION

Field of the Invention

In paint-spraying installations, paint is sprayed under pressure through nozzles in fine dispersion onto objects, for example automobiles, which are to be painted. This is carried out in so-called spraying booths, spraying stations or on spraying walls. The paint mist thus formed must be removed again from the air. For this purpose, air contaminated with paint mists is drawn by means of fans through wet paint mist separators, in which water is passed through in counter-current and brought into intimate contact with the air containing paint mists by means of inserts and the like. A wet paint mist separator of this type has been disclosed by German Auslegeschrift No. 1,269,594.

For precipitating and coagulating the paint particles deposited in the water which is continuously circulated in the wet separator, agents having an alkaline reaction, so-called paint detackifying or coagulating agents, are usually added to the water. This reduces the tendency of the paint particles to deposit on the walls of the wet separator and other structural elements, so that malfunctions and a considerable maintenance and cleaning effort are avoided. The transporting-away and the final storage of the paint sludge are also facilitated when it consists of a non-tacky paint coagulate.

A procedure of this type is described in German Offenlegungsschrift No. 2,758,873, which relates to a process for precipitating synthetic resin paints in wet paint mist separators of paint-spraying installations, using water adjusted to an alkaline reaction and containing an additive which envelops paint particles, which process comprises the use of an aqueous wax dispersion as the additive. In this case, the water is to be adjusted to a pH value of 8.0 to 13.5, concentrated aqueous caustic soda being used for this purpose. The wax dispersion used as the additive contains with advantage a mixture of montan wax and paraffin derivatives. This is a two-component formulation, since alkali is added separately, in addition to the wax dispersion.

Moreover, as practice has shown, this process requires working in the presence of surfactants, even though the use of surfactants is described therein only as being advantageous.

The process described also has the disadvantage that only a sedimenting paint sludge is obtained and that, consequently, it is applied only in Large-scale installations, predominantly in the industry sector producing vehicles. Moreover, this process is not capable of coagulating water-based paint or hydro-paint, since the caustic soda used for adjusting the pH value counteracts the coagulation of this paint.

It was therefore the object of the invention to provide a composition in the form of a one-component formulation for detackifying and coagulating synthetic resin paint fractions in wet separators of paint-spraying installations, by means of which composition the paint sludge can also be caused to float and which is also suitable for detackifying and coagulating water-borne paint or hydro-paint. It was a further object of the invention to provide a one-component formulation which, in contrast to the above state of the art, is largely satisfactory without further additions, in particular without surfactants.

These objects are achieved in particular by the use of a specific wax component in combination with a specific basic component.

The subject of the invention is therefore a one-component formulation for detackifying and coagulating synthetic resin paint fractions in wet separators of paint-spraying installations, for causing the detackified paint sludge either to float or to sediment, which formulation comprises (a) 5 to 20% by weight of carnauba wax or raw montan wax, (b) 10 to 30% by weight of an aminoalcohol, aminoalcohol derivative or morpholine and, if appropriate, (c) 0.1 to 5% by weight of an antifoam, each relative to the weight of the formulation, the remainder of the formulation being represented by water.

The wax components (carnauba wax and raw montan wax) used according to the invention have the characteristic data shown in Table 1 below, which are also known from the specialist literature (see "Ullmann's Enzyklopädie der technischen Chemi [Ullmann's Encyclopedia of Industrial Chemistry]", volume 18, pages 281–283 and 292–295; "Fette-Seifen-Anstrichmittel", 1965, 67, No. 5, pages 334–340, and "Rompps Chemi-Lexikon [Rompp's Dictionary of Chemistry]", Franckh'sche Verlagshandlung, Stuttgart, 3rd edition, page 1192).

TABLE 1

| Characterization of crude montan wax and carnauba wax | | |
|---|---|---|
| | Raw montan wax | Carnauba wax |
| Characteristic data | | |
| Acid number | 31–38 | 4–8 |
| Saponification number | 87–104 | 80–95 |
| Unsaponifiable matter (relative to wax fraction) | 30% | 50–53% |
| Wax fraction | about 76% | about 95% |
| Resin fraction | about 24% | about 5% |
| Wax constituents | | |
| Wax esters of monocarboxylic acids | about 44% | about 69–72% |
| free monocarboxylic acids | with predominantly $C_{26}/C_{28}/C_{30}/C_{32}$ | with predominantly $C_{20}-C_{30}$ |
| Free wax acids generally | about 14% | about 3–3.5% |
| Polyfunctional carboxylic acid-esters | about 19% | about 19% |
| Polyfunctional wax acids | | |
| Wax alcohols (from the unsaponifiable fraction) | about 17% with predominantly $C_{26}/C_{28}/C_{30}$ | about 2–3% with predominantly $C_{22}-C_{28}$ |

TABLE 1-continued

| Characterization of crude montan wax and carnauba wax | | |
|---|---|---|
| | Raw montan wax | Carnauba wax |
| Hydrocarbons | about 1-2% with predominantly $C_{29}/C_{31}/C_{33}$ | about 1.5-3% with predominantly $C_{29}/C_{31}/C_{33}$ |

The raw montan wax used according to the invention differs from the Divinol Koag. wax used in German Offenlegungsschrift No. 2,758,873 in that it consists of a mixture of wax constituents, resin constituents and "bituminous" constituents, whereas the Divinol Koag. wax recipe contains highly refined montan waxes. The carnauba wax used according to the invention also contains resin constituents and "bituminous" constituents, even though its composition, as can be seen in Table 1, is markedly different from that of the raw montan wax (accordingly the two wax types used according to the invention are also clearly different in a visual respect and in their odor).

The common feature of the wax components used according to the invention is thus a resin fraction which amounts to about 24% in the raw montan wax and to about 5% in the carnauba wax. In the Divinol Koag. wax formulation of German Offenlegungsschrift No. 2,758,873, this is not the case.

With regard to provenance, the raw montan wax used according to the invention, also called lignite bitumen, is obtained from lignite. Carnauba wax is a vegetable wax which is obtained on a large scale from the leaves of the Braxilian carnauba palm (genus Copernicia) which grows to a height of 6 to 12 m.

In contrast to German Offenlegungsschrift No. 2,758,873, where a preferred wax dispersion consists of a mixture of montan wax and paraffin derivatives, the one-component formulation according to the invention does not contain any paraffin derivatives.

The preferred quantity for the wax fraction in the one-component formulation according to the invention is 5-20% by weight, preferably about 10-17% by weight.

Component (b) represents amine compounds which are capable, as wax emulsifiers, of forming stable dispersions in water together with the wax. Their quantitative proportion amounts to 10-30% by weight, preferably about 15-25% by weight and in particular about 15-20% by weight.

The following can be used, inter alia, according to the invention as the component (b): technical triethanolamine which consists of about 85% by weight of pure triethanolamine, 10-12% by weight of diethanolamine and 3-4% by weight of monoethanolamine; and also the following compounds which can be used individually or in combination:
diethylaminoethanol,
2-amino-2-methylpropanol,
3-methoxypropylamine,
morpholine,
tris-(hydroxymethyl)-aminomethane,
2-amino-2-ethylpropane-1,3-diol and
2-dimethylamino-2-methylpropanol.

In contrast to German Offenlegungsschrift No. 2,758,873, an alkali component such as caustic soda or caustic potash is unsuitable in the one-component formulation according to the invention, since the reaction product of raw montan wax and caustic potash or soda does not permit stable dispersions in water. Moreover, in German Offenlegungsschrift No. 2,758,873, the alkali component is added separately from the wax dispersion (two-component formulation), whereas in the present invention all the constituents required for detackifying and coagulating the synthetic resin paint fractions are contained in one formulation (one-component formulation).

The antifoam (c) is, if desired, used in a quantity of 0.1-5% by weight (preferably about 1-3% by weight and in particular about 2% by weight. The disadvantage, inherent in the process of German Offenlegungsschrift No. 2,758,873, of vigorous foaming, which occurs even if an antifoam is used, does not apply with the formulation according to the invention. If, however, comparatively slight foaming does occur, this can be cured by addition of components (c). The following are preferably used as component (c): polyether derivatives of an aliphatic alcohol, in particular ethoxylated fatty alcohols or ethoxylated synthetic fatty alcohols. A specific example of component (c) is the ethoxylated fatty alcohol Afranil F flüssig ® [liquid] (marketed by BASF, D-6700 Ludwigshafen, as a pulp deaerator for paper and board manufacture), having the following properties: colorless and odorless liquid; density: 0.98/20° C.; viscosity: 300 mPa s; solidification point: $< -20°$ C.; boiling point $> 200°$ C.; non-inflammable.

The medium of the one-component formulation according to the invention is water from which preferably the "classical" hardness components, which are predominantly calcium and magnesium, have been removed.

Preferably, the one-component formulation according to the invention has the following composition:

| | |
|---|---|
| raw montan wax | 10% by weight |
| technical triethanolamine | 25% by weight |
| softened water | 63% by weight |
| polyether derivative of an aliphatic alcohol | 2% by weight |

The one-component formulation according to the invention can be prepared as follows:

The raw montan wax or the carnauba wax are melted at about 120° C. Component (b) is slowly stirred into this melt. During this step, the temperature should not fall below 100° C. Hot water (approximately half the required quantity of water) is then stirred in as quickly as possible, and subsequently the remainder of the required quantity of water in the form of cold water is stirred in and the antifoam (c) is stirred in immediately at an emulsion temperature of about 80° C. The product must then be packaged immediately; it must not be left to stand while open, since otherwise there is a risk of a skin forming on the surface of the product.

A very important advantage of the composition according to the invention over the state of the art is that it acts in different ways, depending on the concentration in which it is used. If, for example, a floating paint coagulate, that is to say a coagulate which floats on the surface of the water, is desired (for example because the painting installation does not have a bottom scraper or because the installation was specifically designed for a floating paint coagulate), the usual base addition is about 0.1 up to a maximum of about 0.5% (weight/volume), relative to the water volume in the wet separator, and a further addition of about 1 kg of one-component formulation per 20 to 25 kg of overspray paint. If the mode of operation of the painting installation requires a sedimenting paint sludge, which can then be cleared out, for example, by means of a fixed installed bottom scraper, the base addition of the one-component formulation increases to about 0.5-1% (weight/volume), relative to the water volume in the wet separator, and the further addition increases to 1 kg of one-component formulation per 5 to 10 kg of overspray paint.

When a fresh wash-out liquor is used, the base addition thus amounts to 0.1-1% (weight/volume), relative to the water volume in the wet separator, and the further addition, corresponding to the proportions of overspray paint, amounts to about 1 kg of one-component formulation per 5 to 20 kg of overspray paint. Base addition rates preferred corresponding to the above data are about 0.1 to a maximum of 0.5% (weight/volume) or 0.5 to 1% (weight/volume) respectively of one-component formulation, each relative to the water volume in the wet separator, and further addition rates of about 1 kg of one-component formulation per 20 to 25 kg of overspray paint or 1 kg of one-component formulation per 5 to 10 kg of overspray paint respectively.

Versatile use of the one-component formulation according to the invention is thus possible, both in large installations and in small installations which have a water capacity of only about 0.5 to 4 m $^3$.

The one-component formulation according to the invention is suitable for detackifying and coagulating solvent-based paints. Examples of paints which can be detackified and coagulated according to the invention are:
nitro paints
melamine/alkyd resin paints
acrylic and polyester paints
two-component acrylic resin paints
polyurethane paints
metallic base paints and clear paints.

These paints usually have a solids content of up to about 50%. Even the so-called high-solids formulation with a solids content of 75-80% is coagulated and detackified by the one-component formulation according to the invention.

Furthermore, the one-component formulation according to the invention is capable, as stated, of coagulating the so-called hydro paint (water-dilutable paint).

The invention therefore also relates to the use of the present one-component formulation for detackifying and coagulating synthetic resin paint fractions in wet separators of paint-spraying installations.

The example which follows explains the invention.

EXAMPLE

The following one-component formulation is prepared:

| | |
|---|---|
| raw montan wax | 10% by weight |
| technical triethanolamine | 25% by weight |
| (consisting of about 85% of triethanolamine | |
| 10-12% of diethanolamine | |
| 3-4% of monoethanolamine) | |
| hot softened water | 30% by weight |
| cold softened water | 33% by weight |
| Afranil F liquid$^R$ | 2% by weight. |
| (ethoxylated fatty alcohol) | |

For this purpose, the raw montan wax is melted at about 120° C. The triethanolamine is slowly stirred into this melt. During this, the temperature should not fall below 100° C. The hot water is then stirred in as quickly as possible, and subsequently the proportion of cold water, immediately followed by the antifoam at an emulsion temperature of about 80° C. are stirred in. The product is then packaged immediately.

The above one-component formulation is used for coagulating a polyurethane-based top coat (manufactured by Lesonal, Stuttgart) for motor vehicles. With a base addition of 0.1% (weight/volume) of one-component formulation and a further addition of 1 kg of one-component formulation per 15 kg of overspray quantity, a floating, detackified coagulate is here obtained.

What is claimed is:

1. A one-component formulation for detackifying and coagulating synthetic resin paint fractions in an aqueous mixture to obtain a detackified paint sludge, which comprises
    (a) 5 to 20% by weight of carnauba wax or raw montan wax, and
    (b) 10 to 30% by weight of an aminoalcohol, aminoalcohol derivative or morpholine,
each relative to the weight of the formulation, the remainder of the formulation being represented by water.

2. The one-component formulation as claimed in claim 1, which further contains 0.1 to 5% by weight of an antifoam ingredient.

3. The one-component formulation as claimed in claim 1, said component (b) being an ethanolamine mixture predominantly containing triethanolamine.

4. The one-component formulation as claimed in claim 3, said component (b) being a technical triethanolamine consisting of about 85% by weight of triethanolamine, 10-12% by weight of diethanolamine and 3-4% by weight of monoethanolamine.

5. The one-component formulation as claimed in claim 2, said antifoam ingredient being a polyether derivative of an aliphatic alcohol in the form of an ethoxylated fatty alcohol.

* * * * *